United States Patent
Ammoura et al.

(10) Patent No.: US 10,762,734 B2
(45) Date of Patent: Sep. 1, 2020

(54) AUTOMATICALLY GENERATING A COMMERCIAL DRIVER LOGBOOK BASED ON VEHICULAR DATA

(71) Applicant: 2162256 ALBERTA LTD., Edmonton (CA)

(72) Inventors: Ayman Ammoura, Edmonton (CA); David Mulcair, Edmonton (CA)

(73) Assignee: 2162256 ALBERTA LTD., Edmonton (CA)

(*) Notice: Subject to any disclaimer, the term of this patent is extended or adjusted under 35 U.S.C. 154(b) by 0 days.

(21) Appl. No.: 16/657,773

(22) Filed: Oct. 18, 2019

(65) Prior Publication Data

US 2020/0202646 A1 Jun. 25, 2020

Related U.S. Application Data

(63) Continuation-in-part of application No. 16/230,857, filed on Dec. 21, 2018.

(51) Int. Cl.
| | | |
|---|---|---|
| G07C 9/29 | (2020.01) | |
| G07C 5/04 | (2006.01) | |
| G06Q 30/00 | (2012.01) | |
| H04W 88/02 | (2009.01) | |

(52) U.S. Cl.
CPC .......... G07C 9/29 (2020.01); G07C 5/04 (2013.01); G06Q 30/018 (2013.01); H04W 88/02 (2013.01)

(58) Field of Classification Search
None
See application file for complete search history.

(56) References Cited

U.S. PATENT DOCUMENTS

| | | | |
|---|---|---|---|
| 5,267,159 A | 11/1993 | O'Neall | |
| 5,519,255 A * | 5/1996 | Burtch | B60R 25/04 180/287 |
| 5,550,738 A | 8/1996 | Bailey et al. | |
| 6,526,341 B1 | 2/2003 | Bird et al. | |

(Continued)

OTHER PUBLICATIONS

Strouth, Jennifer, "What is an API? Key Fleet Management Integrations," Verizon Connect, [online], 2019, [retrieved on Oct. 9, 2019], Retrieved from the Internet: <URL: https://www.verizonconnect.com/resources/article/key-telematics-api-integrations/>, 6 pages.

(Continued)

*Primary Examiner* — Carlos Garcia
(74) *Attorney, Agent, or Firm* — Carr & Ferrell LLP

(57) ABSTRACT

Systems and methods for automatically generating a commercial driver logbook based on vehicular data is disclosed herein. An example system includes a processor; and memory, the processor being configured to execute instructions stored in memory to perform a first type of authentication of a user based on an identifier received from a mobile device, unlock a door of a vehicle when the first type of authentication is complete, perform a second type of authentication of the user that is based on verification of a code transmitted to the user in response to completion of the first type of authentication, allow a key on event for the vehicle when both the first type of authentication and the second type of authentication are complete, and automatically generating a commercial driver logbook based on real-time drive time data collected from the vehicle.

19 Claims, 10 Drawing Sheets

(56) References Cited

U.S. PATENT DOCUMENTS

| | | | |
|---|---|---|---|
| 6,718,235 | B1 | 4/2004 | Borugian |
| 6,741,933 | B1 | 5/2004 | Glass |
| 6,807,481 | B1 | 10/2004 | Gastelum |
| 6,856,933 | B1 | 2/2005 | Callaghan |
| 7,555,378 | B2 | 6/2009 | Larschan et al. |
| 7,599,770 | B2 | 10/2009 | Hardy |
| 8,538,789 | B1 | 9/2013 | Blank et al. |
| 8,768,565 | B2* | 7/2014 | Jefferies ............ G07B 15/00 701/32.7 |
| 9,031,710 | B2 | 5/2015 | Barrett |
| 9,094,436 | B2 | 7/2015 | Westra et al. |
| 9,245,391 | B2 | 1/2016 | Cook et al. |
| 9,589,393 | B2 | 3/2017 | Botnen |
| 9,633,487 | B2 | 4/2017 | Wright |
| 9,633,568 | B2 | 4/2017 | Mohn et al. |
| 9,685,098 | B1 | 6/2017 | Kypri |
| 9,688,247 | B1* | 6/2017 | Jayaraman ......... G07C 9/00896 |
| 9,721,305 | B2 | 8/2017 | Bomze et al. |
| 9,872,225 | B2 | 1/2018 | Guba et al. |
| 9,911,255 | B2* | 3/2018 | Lee ..................... G07C 9/20 |
| 9,953,366 | B1 | 4/2018 | Rogers et al. |
| 10,127,743 | B2 | 11/2018 | Otzurk et al. |
| 10,137,848 | B2 | 11/2018 | Decia |
| 10,171,950 | B2 | 1/2019 | Diem |
| 10,210,679 | B1 | 2/2019 | Higgs et al. |
| 10,479,370 | B2* | 11/2019 | Gong ................ G07C 9/00309 |
| 2002/0107833 | A1 | 8/2002 | Kerkinni |
| 2003/0139878 | A1* | 7/2003 | DeLuca ............... G01C 21/26 701/36 |
| 2006/0200286 | A1 | 9/2006 | Kumagai et al. |
| 2007/0208503 | A1 | 9/2007 | Harnsberger |
| 2007/0250258 | A1 | 10/2007 | Hager |
| 2009/0292418 | A1 | 11/2009 | Kuykendal |
| 2010/0094482 | A1 | 4/2010 | Schofield et al. |
| 2011/0112969 | A1 | 5/2011 | Zaid et al. |
| 2011/0130916 | A1 | 6/2011 | Mayer |
| 2014/0156111 | A1 | 6/2014 | Ehrman |
| 2015/0120151 | A1* | 4/2015 | Akay .................. G07C 9/28 701/49 |
| 2015/0127253 | A1 | 5/2015 | Torres Hurtado et al. |
| 2016/0110820 | A1 | 4/2016 | Fleck et al. |
| 2017/0349142 | A1 | 12/2017 | Krishnan |
| 2018/0025328 | A1* | 1/2018 | Penilla .............. G06Q 10/1095 705/305 |
| 2018/0308295 | A1 | 10/2018 | Kwak |
| 2018/0365705 | A1 | 12/2018 | Harter et al. |
| 2019/0026962 | A1 | 1/2019 | Gintz et al. |
| 2019/0095358 | A9 | 3/2019 | Cawse et al. |
| 2020/0200649 | A1 | 6/2020 | Ammoura et al. |
| 2020/0202648 | A1 | 6/2020 | Ammoura et al. |

OTHER PUBLICATIONS

"Software that Transportation Companies can rely on," Verizon Connect [online], 2019, [retrieved on Oct. 9, 2019], Retrieved from the Internet: <URL: https://www.verizonconnect.com/industries/gps-truck-tracking/>, 4 pages.

Martens et al., "Access to digital car data and competition in aftersales services," JRC Digital Economy Working Paper, Sep. 2018, pp. 8-10.

"Toyota Adds Fleet complete Data Platform," AutomativeFleet.com, [online], Sep. 26, 2018, [retrieved on Oct. 9, 2019], Retrieved from: <URL: https://www.automotive-fleet.com/314227/toyota-fleet-complete-to-enhance-fleet-vehicle-data>, 2 pages.

"Connvex for OEMs and Suppliers," Connvex.com, [online], 2019, [retrieved on Oct. 9, 2019], Retrieved from the Internet: <URL:https://www.connvex.com/connvex-for-oems>, 6 pages.

"Mileage Ace Pro," Milage-Ace.com, [online], 2019, [retrieved on Oct. 9, 2019], Retrieved from the Internet: <URL: https://www.mileage-ace.com/mileage-tracker/pro/>, 4 pages.

"Automatic mileage tracker & expense log," Everlance.com, [online], 2019, [retrieved on Oct. 9, 2019], Retrieved from the Internet: <URL:https://www.everlance.com/>, 15 pages.

YouTube: "Car2go, How to use car2go—use the app to begin a rental" [online], [retrieved on Jun. 14, 2016] Retrieved from the Internet: <https://www.youtube.com/watch?v=tjX5IVAqQcs>.

Sridhar, "How Geotab Cloud ELD Works," Geotab.com, [online], Aug. 11, 2017, [retrieved on Oct. 9, 2019], Retrieved from the Internet: <https://www.geotab.com/blog/cloud-eld/>, 9 pages.

"ELD Compliance," KeepTruckin.com, [online], 2019, [retrieved on Oct. 9, 2019], Retrieved from the Internet: <URL: https://keeptruckin.com/eld-compliance>, 6 pages.

"ELD Compliance Solution," Samsara.com [online], 2019, [retrieved on Oct. 9, 2019], Retrieved from the Internet: <URL:https://www.samsara.com/fleet/eld-compliance>, 13 pages.

Abrosimova, Kate, "How to Develop a Mobile HOS Electronic Logbook App for Long-Haul Drivers in the US," Yalantis.com [online], 2019, [retrieved on Oct. 9, 2019], Retrieved from the Internet: <URL:https://yalantis.com/blog/how-can-you-develop-hos-electronic-logbook-app-for-your-long-haul-drivers/>, 7 pages.

"Original Equipment Manufacturer (OEM) GPS Development," RhinoFleetTracking.com, [online], 2019, [retrieved on Oct. 9, 2019], Retrieved from the Internet: <URL:https://www.rhinofleettracking.com/gps-fleet-tracking/oem-gps-development/>, 3 pages.

Novosilska, Lyudmyla, "10 Companies Impacting the Connected Car Ecosystem Through APIs ," IgniteOutsourcing.com, [online], 2019, [retrieved on Oct. 9, 2019], Retrieved from the Internet: <URL:https://igniteoutsourcing.com/automotive/connected-car-api/>, 13 pages.

"Electronic Logging Device Technical Specifications Frequently Asked Questions," U.S. Department of Transportation, Federal Motor Carrier Safety Administration, Revised; [online], Sep. 2017, [retrieved on Oct. 9, 2019), Retrieved from the Internet <URL:https://www.google.com/url?sa=t&rct=j&q=&esrc=s&source=web&cd=10&cad=rja&uact=8&ved=2ahUKEwjS7Sv-xY_1AhWsxVkKHaUAD_8QFjAJegQIABAC&url=https%3A%2F%2Feld.fmcsa.dot.gov%2FFile%2FIndex%2F92060164-38df-0e7a-e053-0100007fdb4c&usg=AOyVaw2uRAPGcsB9OT7aL3J8r3FW>. 19 pages.

"MileIQ, How it Works," MileIQ.com, [online], 2019, [retrieved on Oct. 9, 2019], Retrieved from the Internet: <URL: https://www.mileiq.com/howitworks/>, 9 pages.

"MileIQ Tutorial—How to get started," MileIQ, published on Youtube.com, [online], Jan. 19, 2018, [retrieved on Oct. 9, 2019], Retrieved from the Internet: <URL:https://www.youtube.com/watch?v=mCnQGj6a924,>, 1 page.

"TripLog Webinar—Quick Guide to Mileage Tracking for Small Business," TripLog, published on Youtube.com, [online], Jan. 19, 2018, [retrieved on Oct. 9, 2019], Retrieved from the Internet: <URL:https://www.youtube.com/watch?v=6XJr2nXgXrw,>, 1 page.

"How to Automatically Track Your Mileage with QuickBooks Self-Employed on Your Mobile | AUS," QuickBooks, published on Youtube.com, [online], Jan. 19, 2018, [retrieved on Oct. 9, 2019], Retrieved from the Internet: <URL:https://www.youtube.com/watch?v=230aQPAtsc8,>, 1 page.

* cited by examiner

AUTOMATICALLY GENERATING A COMMERCIAL DRIVER LOGBOOK BASED ON VEHICULAR DATA

CROSS REFERENCE TO RELATED APPLICATIONS

This application is a continuation-in-part of U.S. application Ser. No. 16/230,857, filed on Dec. 21, 2018, which is hereby incorporated by reference herein in its entirety, including all references and appendices cited therein, for all purposes.

FIELD OF THE INVENTION

The present technology pertains to vehicles, and more particularly, but not by way of limitation, to systems and methods that provide for automatically generating a commercial driver logbook based on vehicular data. Some embodiments include automatic drive time logging (e.g., automatically generating a commercial driver logbook) and automated vehicular control associated with drive time limitations.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes performing a first type of authentication of a user based on an identifier received from a mobile device; unlocking a door of a vehicle when the first type of authentication is complete; performing a second type of authentication of the user that is based on verification of a code transmitted to the user in response to the completion of the first type of authentication; allowing a key on event for the vehicle when both the first type of authentication and the second type of authentication are complete; and automatically generating a commercial driver logbook based on real-time drive time data collected from the vehicle.

Another general aspect includes a system having a processor; and a memory, the processor being configured to execute instructions stored in memory to perform at least two types of authentication to respectively unlock and start a vehicle based on at least an interaction between the vehicle and a mobile device; identify a driver based on the mobile device; identify a vehicle type; automatically track driving parameters during a drive time of the vehicle by the user that is initiated by the start or movement of the vehicle; and generate a commercial driver logbook using the drive time data of the vehicle.

According to some embodiments, the present disclosure is directed to an example system comprising an orchestration service that is configured to receive an identifier that is generated by any of an application residing on a mobile device or the orchestration service; perform a first type of authentication of a user based on the identifier; identify a vehicle type of the vehicle, wherein the vehicle type indicates that the vehicle is a commercial vehicle; and a vehicle controller that is configured to unlock the vehicle based on the first type of authentication; start the vehicle based on a second type of authentication; automatically track driving parameters during a drive time of the vehicle by the user that is initiated by the start of the vehicle; and generate a driving log using the drive time of the vehicle.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
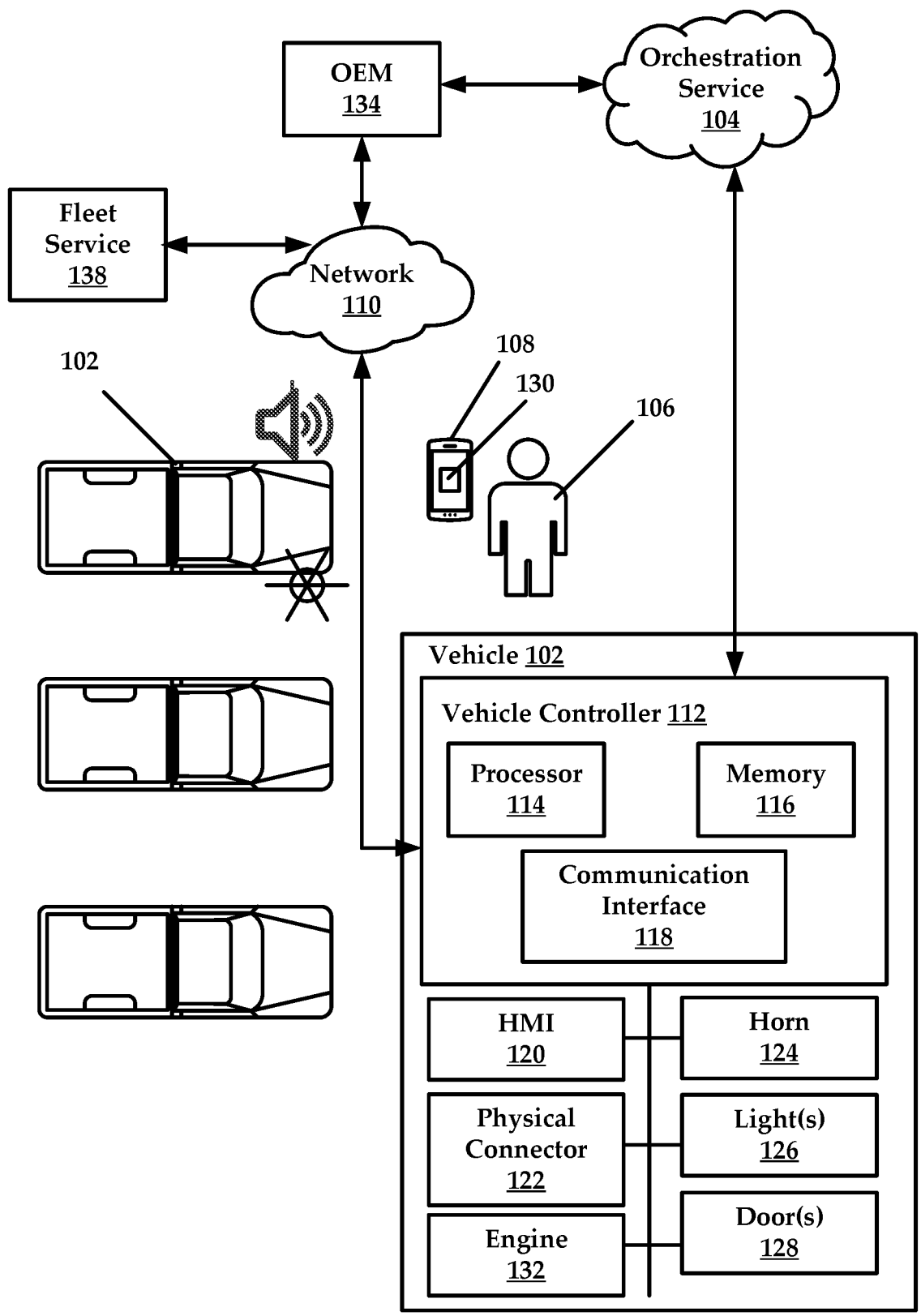
FIG. 1 is a schematic diagram of an example system constructed in accordance with the present disclosure.

Generally speaking, the present disclosure is directed to systems and methods that automatically generate commercial driver logbooks, or other similar driving records. In various embodiments, the systems and methods herein can authenticate a user of a vehicle using a mobile device. After authenticating the user, various vehicle parameters can be identified and a driver logbook created. According to some embodiments, the driver logbook is automatically created based on driving data collected in real-time or near-real-time. That is, a system of the present disclosure can begin automatically populating a commercial driver logbook with drive time data upon the occurrence of a triggering event, such as a key-on event when the vehicle engine is started. Another triggering event can include detected movement of the vehicle.

Once the triggering event occurs, drive time data, such as vehicle operating time (how long the driver has been operating the vehicle), vehicle type, mileage, intermittent key-on/key-off events, and other similar data are automatically logged and stored. These drive time data can be stored in association with information regarding the driver.

The automatically generated commercial driver logbook can be used to determine if a commercial driver has exceeded allowable operating hours for a day. For example, in a 24 hour period, a commercial driver may be limited to driving for only eight hours before a mandatory rest period is required.

The automatically generated commercial driver logbook can also be used to enforce these mandatory rest periods. In various instances, when a vehicle controller (or other similar system within the vehicle) determines that a commercial driver has exceeded their allotted driving time for a day, the vehicle can automatically disable engine restart for the vehicle for a period of time. For example, the commercial driver may not be allowed to restart or move the commercial vehicle for at least eight or ten hours.

Existing system are not configured to automatic commercial driver logbook creation. Some system may require logbook creation by confirming with a dispatcher, or installing a device within the commercial vehicle. The systems and method disclosed herein allow for direct interface with vehicle systems to obtain real-time or near-real-time drive time data from the vehicle. Directly obtaining information from vehicle systems prevents any opportunity for a driver to falsify a commercial driver logbook. This direct sensing of information from vehicle systems allows for creation of more robust commercial driver logbooks as data such as exact mileage, class of vehicle, commercial vehicle, special license requirements, and so forth can be determined and logged. Additionally, no systems exist that allow commercial driver limitations to be imposed automatically and without driver intervention. Direct control of vehicle systems is contemplated where the commercial vehicle can be disabled based on commercial driver logbook data in view of any driving restrictions for the commercial driver, such as daily operating limits.

As noted above, the systems and methods herein can utilize authentication of the driver for safety and as a basis for enabling automatic commercial driver logbook creation. In some instances, these systems and methods use two factor authentication (hereinafter "TFA") within the context of controlling access to a vehicle. In some embodiments, the TFA-based processes implemented herein allow users to rent vehicles in an automated manner and using specifically configured vehicles. Some specifically configured vehicles include human machine interfaces and physical interfaces or connectors that couple with a mobile device of a user as part of a TFA process.

It will be understood that while some embodiments disclosed herein refer to applications of the present technology for use in renting vehicles, the systems and methods herein are not so limited. That is, the systems and methods herein generally provide for secure access to vehicles or other operations thereof by a user. In one example use case, vehicles in a fleet of an enterprise can be accessed and used by an employee or other similar user using the systems and methods disclosed herein.

In various embodiments, in a fleet use scenario, the systems and methods herein can provide for restricted use of vehicles. For example, one or more employees of a company can be provided access only certain vehicles of that company's fleet as allowed by the class of the driver's license of the employee. Thus, if the employee is not certified to operate a large commercial vehicle, the systems and methods herein prevent the employee from access to such a vehicle.

Also, while the present disclosure generally discussed vehicles such as cars, these fields of use are not intended to be limiting. Thus, other types of vehicles or machinery such as boats, planes, or industrial machinery such as a skid or forklift can have controlled access through use of the present disclosure.

Some embodiments include the use of an orchestration system to provide various types of authentication. In various embodiments, the orchestration system can cause the vehicle to lock and unlock doors within the context of a TFA process. The orchestration system can also cause the vehicle to perform other actions such as horn honking, light flashing, trunk opening, engine ignition, and the like.

In some embodiments, these methods and systems allow for the vehicle to be rented and driven by a user without a key present within the vehicle. These and other advantages of the present disclosure are provided in greater detail herein with reference to the collective drawings.

In general, the embodiments, of FIGS. 1-4B illustrate various methods and systems for allowing a user to access a vehicle, such as a commercial vehicle, using a mobile device. These embodiments describe processes related to authentication of the driver and/or the vehicle for allowing access to the vehicle and/or enabling vehicle engine start. The methods and systems associated with FIGS. 6-9 collectively describe embodiments related to automatic commercial driver logbook creation and commercial vehicle control.

FIG. 1 is a schematic representation of an example environment where aspects of the present disclosure are practiced. In one embodiment, the environment includes a vehicle 102, an orchestration service 104, a user 106, a mobile device 108, and a network 110. For context, the user 106 desires to rent the vehicle 102, which can be located amongst a plurality of other vehicles.

In general, each of the components of the environment can communicate over the network 110. The network 110 may include any one or a combination of multiple different types of networks, such as cable networks, the Internet, cellular networks, wireless networks, and other private and/or public networks. In some instances, the network 110 may include cellular, Wi-Fi, or Wi-Fi direct. In other embodiments, components of the environment can communicate using short-range wireless protocols such as Bluetooth, near-field, infrared, and the like.

Generally, the present disclosure provides an automated and secure vehicle control and/or rental method that utilizes at least two-factor authentication. Some embodiments contemplate more than two factors of authentication. In some embodiments, the vehicle 102 comprises a vehicle controller 112 that in turn comprises a processor 114, memory 116, and a communication interface 118. The vehicle 102 also can include a human machine interface (HMI 120), a physical connector 122, a horn 124, light(s) 126, door(s) 128, and an engine 132.

In various embodiments, the orchestration service 104, vehicle controller 112, and mobile device 108 cooperate to provide automated, TFA-based vehicle rental. In some embodiments, the mobile device 108 implements an application 130 that allows the user 106 to interact with the orchestration service 104. In one or more embodiments, the orchestration service 104 can be implemented as a cloud-based service, or alternatively in a physical or virtual server configuration.

In various embodiments, the orchestration service 104 is used to perform an automated, TFA-based vehicle rental process. In another embodiment, the vehicle controller 112 can be configured to perform an automated, TFA-based vehicle rental process. In yet other embodiments, the orchestration service 104 and the vehicle controller 112 can cooperatively function to perform an automated, TFA-based vehicle rental process.

According to some embodiments, when the user 106 enters an area near the vehicle 102, the user 106 utilizes the application 130 on the mobile device 108 to obtain a list of available vehicles from the orchestration service 104. Using a location of the mobile device 108 (generated natively within the mobile device), the orchestration service 104 generates the list of available vehicles near the user 106 and transmits the same for display through the application 130 on the mobile device 108. The user 106 can select the vehicle 102 from the list.

In another embodiment, rather than selecting from a list, the user 106 can enter a portion or all of a vehicle identification number (VIN) of their selected vehicle into the application 130 on the mobile device 108. The orchestration service 104 can determine if the vehicle is available for rental. In another example embodiment, the user 106 can obtain a picture of the VIN using a camera of the mobile device 108. The orchestration service 104 is configured to determine the VIN number from the photograph received from the mobile device 108.

In another embodiment, the user 106 can be assigned the vehicle 102 rather than the user being allowed to choose. In these instances, the orchestration service 104 can assist the user 106 in locating the vehicle 102 by causing the vehicle controller 112 to activate any of the horn 124 and/or the light(s) 126. This functionality is advantageous when a plurality of vehicles are present. In another example embodiment, the orchestration service 104 can provide the user 106 with a portion or all of the VIN number of the vehicle 102 through the application 130. The user 106 can use the VIN data to differentiate between vehicles and select the proper vehicle. In addition to (or in lieu of) a VIN number a license plate number can be utilized.

It will be understood that prior to renting any vehicle, the user 106 creates an account with the orchestration service 104. In some embodiments, registration can be accomplished through the application 130 on the mobile device 108. Once the user is registered and an account established, the user 106 can rent a vehicle. The orchestration service 104 can generate a unique identifier for the user 106 during the account creation process.

When the vehicle 102 is selected using any of the methods described, the orchestration service 104 can perform a first type of authentication of the user 106. In this embodiment, the first type of authentication includes the orchestration service 104 verifying that the user 106 is registered (e.g., account properly created) with the orchestration service 104.

In some embodiments, the first type of authentication includes verifying the unique identifier for the user 106 that is stored in the application 130 or otherwise on the mobile device 108. The mobile device 108 transmits this unique identifier (along with the VIN information when needed) to the orchestration service 104.

If the user 106 is registered (through verification of the unique identifier), the orchestration service 104 transmits an unlock command to the vehicle controller 112. The vehicle controller 112 unlocks the door(s) 128 of the vehicle 102 in response to receiving the unlock command.

In addition to transmitting the unlock command, the orchestration service 104 also transmits a code to the application 130 of the mobile device 108. The code is used in a second type of authentication in some embodiments.

The user 106 can enter this code into a graphical user interface (GUI) presented on the HMI 120 of the vehicle.

Figure 2:
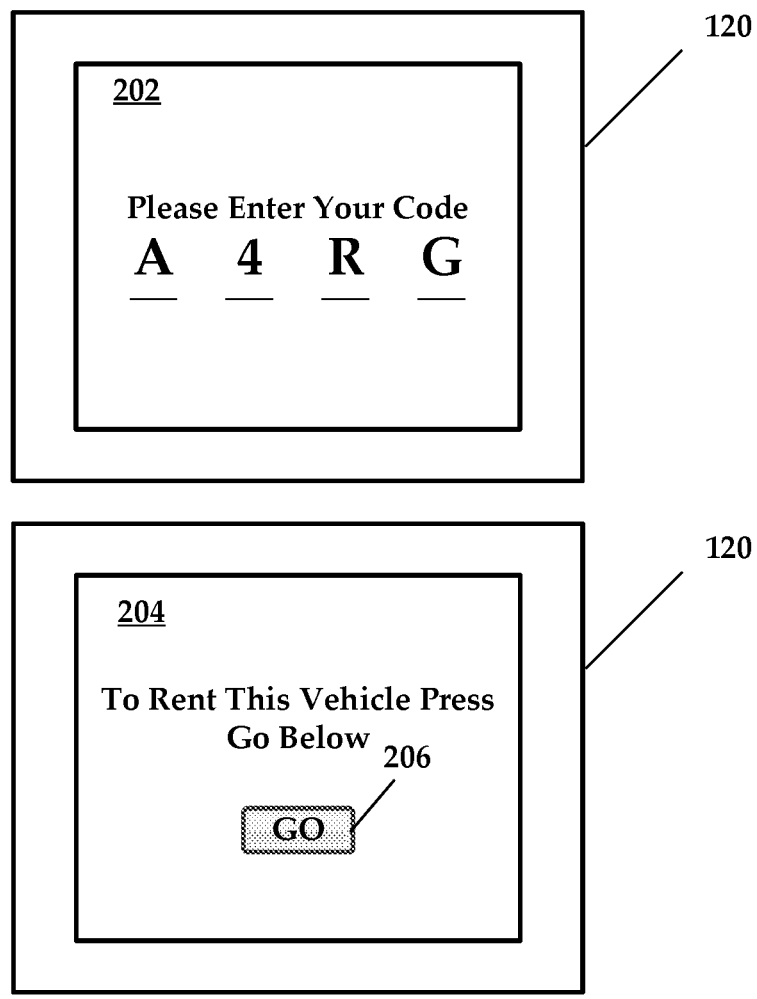
FIG. 2 illustrates various GUIs on a human machine interface.

FIG. 2 illustrates an example code entered into a GUI 202 of the HMI 120. If the code entered into the HMI 120 matches the code generated by the orchestration service 104, the user 106 is presented with another GUI 204 where the user 106 can select a button 206 to confirm that they desire to rent the vehicle 102. To be sure, this is merely an example of how a user could indicate that they wish to rent the vehicle is not intended to be limiting.

In one or more embodiments, when the code entered into the HMI 120 matches the code generated by the orchestration service 104 and presented to the application 130, the orchestration service 104 can transmit a vehicle start command to the vehicle controller 112. The vehicle controller 112 can start the engine 132 of the vehicle 102 in response and the user 106 can drive the vehicle away.

In some embodiments, another factor of authentication could include the user 106 plugging their mobile device 108 into the physical connector 122 of the vehicle 102. In some instances, the plugging of the mobile device 108 into the physical connector 122 of the vehicle 102 can replace the code matching process and thus serve as the second factor of authentication. In such an embodiment the vehicle controller 112 and/or the orchestration service 104 can verify aspects of the mobile device 108 or application 130, as will be discussed in greater detail infra.

In one embodiment, the physical connector 122 includes a wired connection that couples the mobile device 108 with, for example, an onboard diagnostics (OBD) port. In another embodiment, the physical connector 122 includes a wired connection that couples the mobile device 108 with, for example, the HMI 120. In yet another embodiment, the physical connector 122 includes a wired connection that couples the mobile device 108 with, for example, the vehicle controller through a universal serial bus (USB) connector or auxiliary port in a dashboard or console of the vehicle 102.

In some embodiments, when the mobile device 108 is connected through the physical connector 122, the vehicle controller 112 can obtain the code and transmit the code to the orchestration service 104 as the second type of authentication rather than requiring the user 106 to type the code into the HMI 120.

According to some embodiments, the vehicle controller 112 can be configured to sense a paired presence of the mobile device 108 during vehicle operations. This can include sensing a connection over the physical connector 122 or a connection over a short-range wireless connection. If the mobile device 108 that initiated the initial authentication is not present, the HMI 120 can present a WARNING that the authentication device (e.g., mobile device 108) is not detected and/or provide direction to the user to return the vehicle 102. This will ensure that only paying renters/authorized drivers only are allowed to operate the vehicle. In another advantage, this prevents the driver or user from driving away and inadvertently forgetting their mobile device 108.

As briefly mentioned above, rather than using a code, the second type of authentication includes the mobile device 108 being connected through the physical connector 122. The vehicle controller 112 reads the unique code referenced above that was used to perform the first type of authentication and provides this unique code that was read directly off of the mobile device 108 by the vehicle controller 112. When this unique code matches the unique code generated by the orchestration service 104 the user 106 is authenticated a second time. Rather than using the unique code a second time, the user 106 can be authenticated a second time by other data such as an International Mobile Equipment Identity (IMEI) of the mobile device 108 or a code that is embedded into the application 130 of the mobile device 108. Another type of immutable value related to the mobile device 108 can also be used. This information can be gathered and stored in the orchestration service 104 when the user 106 creates an account.

In an example general use case, the orchestration service 104 is a system that is configured to perform a first type of authentication of a user using a unique identifier for a user of a mobile device. Next, the orchestration service 104 transmits an unlock request to a vehicle controller when the first type of authentication is complete. The vehicle controller unlocks a door of the vehicle in response. Next, the orchestration service 104 performs a second type of authentication of the user and then transmits an indication to the vehicle controller of the vehicle to confirm that the second type of authentication is complete. Thus, the user can rent the vehicle when both the first type of authentication and the second type of authentication are complete by the orchestration service 104.

In another example general use case, the vehicle controller 112 is a system that is configured to receive an indication of a first type of authentication being completed by the orchestration service 104. Next, the vehicle controller 112 receives an unlock command when the first type of authentication is complete. Next, the vehicle controller 112 is configured to receive an indication of a first type of authentication being completed by the orchestration service 104. This may also include receiving an engine start command from the orchestration service 104. In one example, the message that indicates that the first type of authentication is complete is coupled with an unlock command and the message that indicates that the second type of authentication is complete is coupled with an engine start command.

During the term of the rental, the user 106 can utilize the application 130 to lock and/or unlock the vehicle 102, start the engine 132 of the vehicle 102, and so forth. These functionalities remain active until the user 106 indicates that they wish to terminate the rental period.

In some embodiments it will be understood that the user 106 does not need to be in possession of a key for the vehicle 102 in order to rent and drive the same. After the vehicle has been rented, in some embodiments, each time the vehicle 102 experiences a turn off event, the vehicle controller 112 can present the user 106 with a message through the HMI 120 (or through the application 130) that queries the user 106 as to whether the user 106 desires to continue or terminate the rental.

In some embodiments, the user 106 may be required, as directed by applicable laws, to select or agree to various rental provisions such as insurance, damage waivers, fueling agreements, and so forth. One of ordinary skill in the art will appreciate that these requirements may vary per locale such as by state or country.

According to some embodiments, rather than requiring the orchestration service 104 to perform each factor of authentication, the vehicle controller 112 can be configured to perform one or more of the types of authentication. In one embodiment, the orchestration service 104 performs the first type of authentication, which can include any of the methods described above in order for the door(s) 128 of the vehicle 102 to be unlocked. The second factor of authentication can be completed by the vehicle controller 112. For example, the vehicle controller 112 can generate a random code that is transmitted to the mobile device 108 over a short-range wireless connection via the communication interface 118. The user 106 can enter this code into the HMI 120 of the vehicle 102.

In another embodiment, when the application 130 is active on the mobile device 108, the mobile device 108 can communicate with the vehicle controller 112 when the mobile device 108 is proximate (e.g., within short-range wireless connectivity range). The vehicle controller 112 can be configured to acknowledge a code received over a short-range wireless connection in order to unlock the door(s) 128 of the vehicle 102, as a first type of authentication. The orchestration service 104 can perform a second type of authentication using any of the methods described herein.

According to some embodiments, the environment of FIG. 1 can also generally include an original equipment manufacturer (OEM) connectivity service or system (OEM 134). In general, some vehicle manufacturers provide a connectivity service that can be used to control certain aspects of vehicle operation. For example, these systems can provide door locking/unlocking, engine start/stop, and other services. In some embodiments, rather that utilizing the orchestration service 104 to issue commands to the vehicle controller 112, the orchestration service 104 can interface with the OEM 134. For example, the orchestration service 104 can be used to perform TFA methods and potentially driver restriction while the OEM 134 is used to issue commands to the vehicle controller 112. Thus, rather than directly issuing commands to the vehicle controller 112, the orchestration service 104 indirectly issues commands to the vehicle controller 112 using the OEM 134. For example, the orchestration service 104 can indicate to the OEM 134 that an unlock command is to be transmitted to the vehicle controller 112. The OEM 134 sends the unlock command in response. In sum, the orchestration service 104 can use the OEM 134 as a proxy to interact with the vehicle controller 112.

Figure 3:
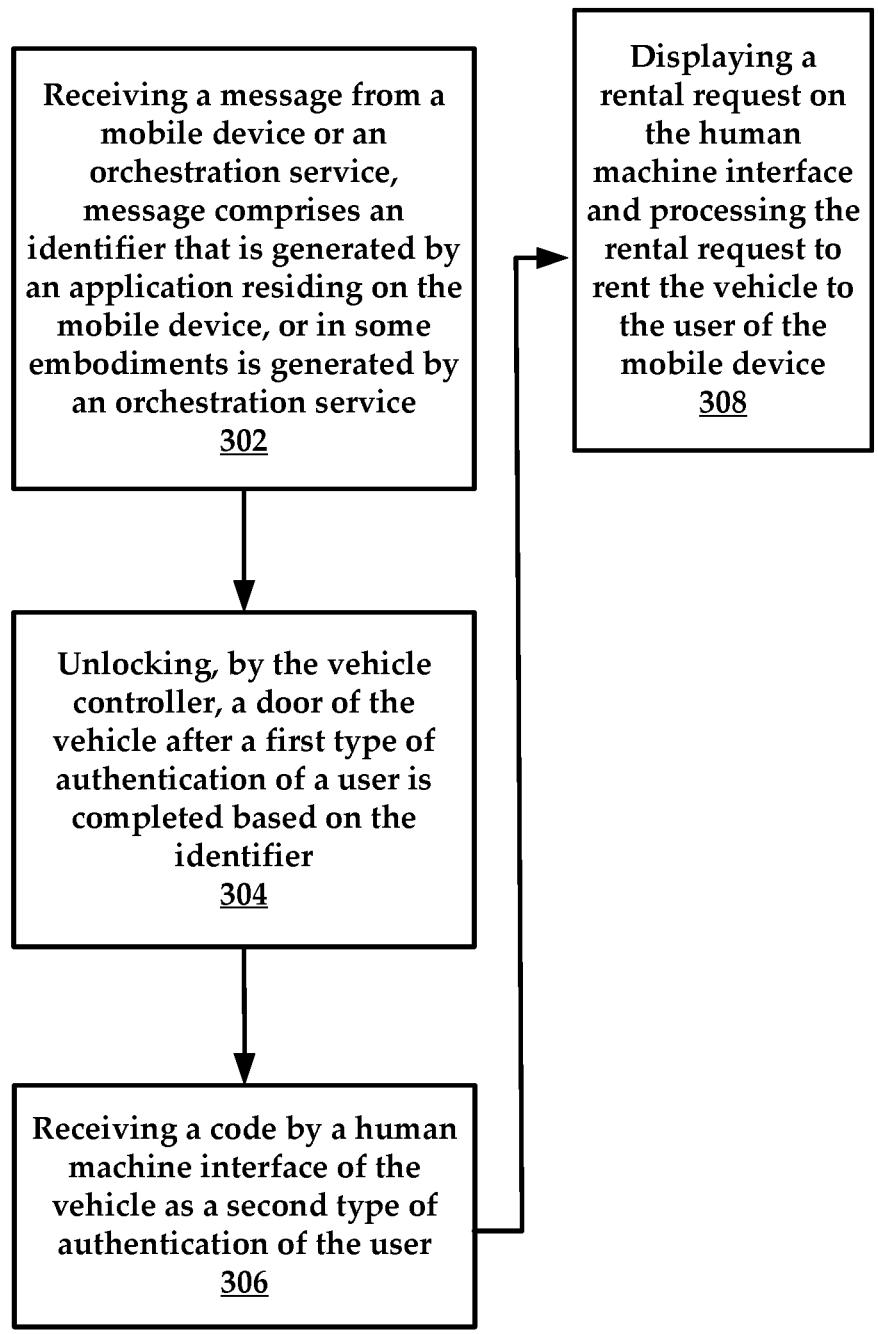
FIG. 3 is a flowchart of an example method of the present disclosure.

FIG. 3 is a flowchart of an example method of the present disclosure. The method, in this example, is performed from the perspective of the vehicle controller as described above. In one embodiment, the method includes a step 302 of receiving a message from a mobile device or an orchestration service.

The message comprises an identifier that is generated by an application residing on the mobile device, or in some embodiments is generated by an orchestration service. The identifier can correspond to a unique identifier created for the user by the orchestration system when the user created an account. In some the message is received when the mobile device is within proximity to a vehicle controller of a vehicle.

Next, the method includes a step 304 of unlocking, by the vehicle controller, a door of the vehicle after a first type of authentication of a user is completed based on the identifier.

In various embodiments, the method includes a step 306 of receiving a code by a human machine interface of the vehicle as a second type of authentication of the user. The code can be transmitted to the mobile device by a cloud service.

In various embodiments, the method can include a step 308 of displaying a rental request on the human machine interface and processing the rental request to rent the vehicle to the user of the mobile device.

In yet another embodiment, the rental request is displayed on the mobile device and processing of the rental request is performed in order to rent the vehicle to the user of the mobile device.

In one or more embodiments verifying the identifier is considered the first type of authentication, and this verification can be performed if the user is registered with the cloud service. The unlock request is received from the cloud service after the first type of authentication is complete.

Figure 4A:
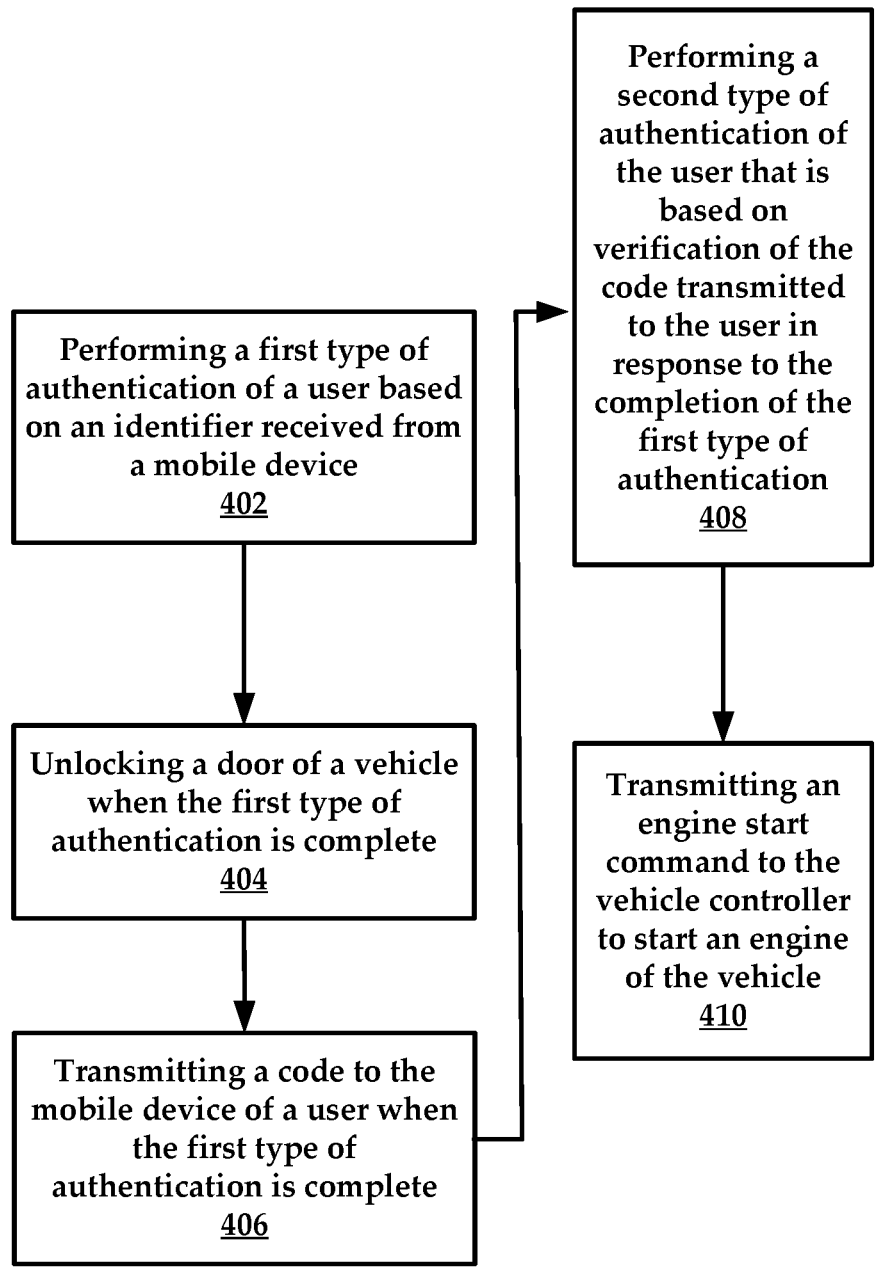
FIG. 4A is a flowchart of another example method of the present disclosure.

FIG. 4A is a flowchart of another example method of the present disclosure. This method is performed by an example orchestration service of the present disclosure. In one embodiment, the method includes a step 402 of performing a first type of authentication of a user based on an identifier received from a mobile device. This first type of authentication can include any of the methods for authentication described herein.

Next, the method includes a step 404 of unlocking a door of a vehicle when the first type of authentication is complete. This step can be performed indirectly as the orchestration service can transmit an unlock command to the vehicle controller when the first type of authentication is complete.

The method can include a step 406 of transmitting a code to the mobile device of a user when the first type of authentication is complete. In certain embodiments, the method includes a step 408 of performing a second type of authentication of the user that is based on verification of the code transmitted to the user in response to the completion of the first type of authentication. In one embodiment, the user enters the code they received on their mobile device into an HMI of the vehicle. The vehicle forwards this code to the orchestration service and the orchestration service confirms that the code received through the HMI correspond to the code transmitted to the mobile device.

Thus, the method can include steps such as presenting a graphical user interface on a human machine interface of the vehicle, receiving, by a human machine interface of the vehicle, the code, verifying the code by the cloud service, and receiving an indication from the cloud service that the code received by the human machine interface is verified. These steps are performed by the vehicle controller but have corresponding steps that are performed by the orchestration service.

In various embodiments, once the first and second types of authentication have been completed, the method includes a step 410 of transmitting an engine start command to the vehicle controller to start an engine of the vehicle.

In some embodiments, the second type of authentication further comprises a step of sensing connection of the mobile device with a physical interface of the vehicle and then verifying any of the identifier of the mobile device or a complete vehicle identification number of the vehicle.

In one or more embodiments, prior to step 402 of the method, the method can include processes such as the orchestration service determining a location of the mobile device and providing a list of vehicles that includes the vehicle to an application executing on the mobile device. To be sure, the list of vehicles is based on the location. The method includes receiving a selection of the vehicle from the application executing on the mobile device and providing a portion of a vehicle identification number of the vehicle to the application executing on the mobile device. This allows the user to verify the identity of the vehicle to which they have been assigned.

Figure 4B:
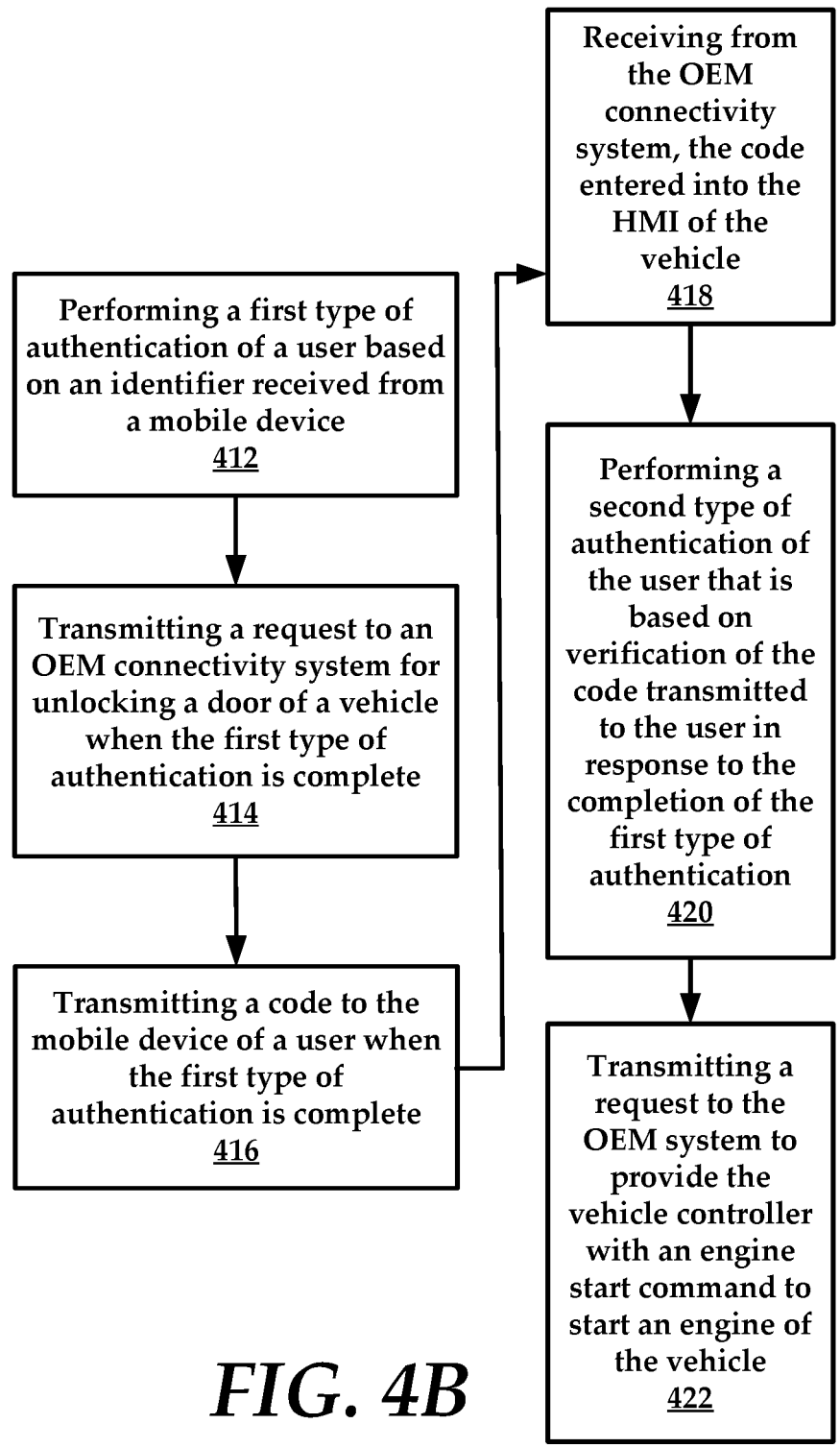
FIG. 4B is a flowchart of another example embodiment using OEM control.

FIG. 4B is a flowchart of another example method of the present disclosure that involves using an OEM system for vehicle control. This method is performed by an example orchestration service of the present disclosure in combination with an OEM connectivity system. In one embodiment, the method includes a step 412 of performing a first type of authentication of a user based on an identifier received from a mobile device. This first type of authentication can include any of the methods for authentication described herein.

Next, the method includes a step 414 of transmitting a request to an OEM connectivity system for unlocking a door of a vehicle when the first type of authentication is complete. This step can be performed indirectly as the orchestration service can transmit an unlock command to OEM connectivity service when the first type of authentication is complete. The OEM connectivity service completes the unlock command request to the vehicle controller.

The method can include a step 416 of transmitting a code to the mobile device of a user when the first type of authentication is complete. In one embodiment, the user enters the code they received on their mobile device into an HMI of the vehicle. The vehicle forwards this code to the orchestration service and the orchestration service confirms that the code received through the HMI correspond to the code transmitted to the mobile device.

In some embodiments, this forwarding is performed through use of the OEM connectivity system. Thus, in some instances, the method includes a step 418 of receiving from the OEM connectivity system, the code entered into the HMI of the vehicle.

In certain embodiments, the method includes a step 420 of performing a second type of authentication of the user that is based on verification of the code transmitted to the user in response to the completion of the first type of authentication.

Thus, the method can include steps such as presenting a graphical user interface on a human machine interface of the vehicle, receiving, by a human machine interface of the vehicle, the code, verifying the code by the cloud service, and receiving an indication from the cloud service that the code received by the human machine interface is verified. These steps are performed by the vehicle controller but have corresponding steps that are performed by the orchestration service.

In various embodiments, once the first and second types of authentication have been completed, the method includes a step 422 of transmitting a request to the OEM system to provide the vehicle controller with an engine start command to start an engine of the vehicle. To be sure, in some embodiments, the orchestration service can issue this command directly in some embodiments.

In some embodiments, the second type of authentication further comprises a step of sensing connection of the mobile device with a physical interface of the vehicle and then verifying any of the identifier of the mobile device or a complete vehicle identification number of the vehicle.

In one or more embodiments, prior to step 402 of the method, the method can include processes such as the orchestration service determining a location of the mobile device and providing a list of vehicles that includes the vehicle to the application executing on the mobile device. To be sure, the list of vehicles is based on the location. The method includes receiving a selection of the vehicle from the application executing on the mobile device and providing a portion of a vehicle identification number of the vehicle to the application executing on the mobile device. This allows the user to verify the identity of the vehicle to which they have been assigned.

As noted above, this method can also include a step where the orchestration service performs a security check prior to allowing the user to have access to the vehicle. That is, the orchestration service can store credentials such as driver's license in the user's account. If the user does not possess the requisite credentials, the user is not allowed to operate or access the vehicle.

Figure 5:
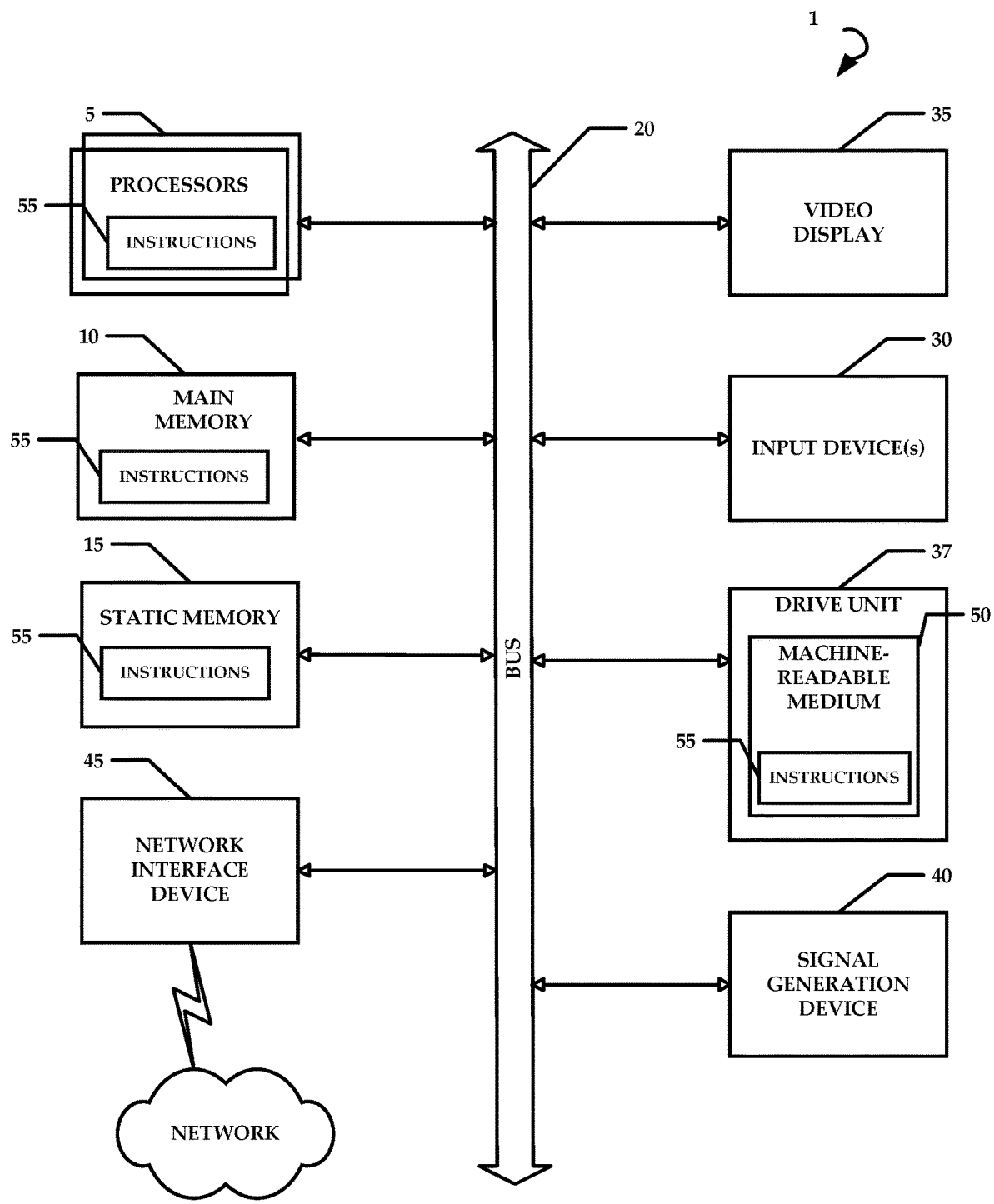
FIG. 5 is a diagrammatic representation of an example machine in the form of a computer system.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

According to some embodiments, the systems and methods disclosed herein can be adapted to provide automated drive time logging, along with other related features. Automated drive time logging can be used in any situation where tracking a driving time, driving distance, or other similar drive time parameter is desired. In one example, the vehicle could include a commercial vehicle, such as a semi-truck. The user or driver of the vehicle may be constrained to only drive a certain number of hours per day or within a defined period of time. These drive time limits may be based on local, state, or federal laws in a particular jurisdiction.

In general, these methods related to drive time tracking can utilize any of the aforementioned processes to identify a driver, as well as provide access to a vehicle (including unlocking and automated start) using multi-factor authentication.

Referring back to FIG. 1, the vehicle 102 can include a commercial vehicle, such as a semi-truck. The user can access the vehicle 102 using their mobile device 108 using the methods described above, which can include mediation through the orchestration service 104 and/or the OEM 134. In addition to authenticating the user through their mobile device 108, the orchestration service 104 can also determine that the vehicle type requested is commercial. The orchestration service 104 can maintain a list of vehicles, which are tagged as commercial vehicles or non-commercial vehicles. For example, the orchestration service 104 can maintain a list of vehicles, identified by their VIN number or license plate, which can be tagged as either commercial or non-commercial (e.g., vehicle class). Rather than using a list, the orchestration service 104 can receive vehicle parameters from the vehicle controller 112, which can be searched against the OEM 134 to determine the vehicle type.

Regardless of the method used to determine the vehicle type, once the orchestration service 104 determines that the user is requesting a commercial vehicle, the orchestration service 104 can optionally determine if the user is permitted to utilize the commercial vehicle.

In one embodiment, the orchestration service 104 can maintain a driver profile, which indicates what types of vehicles that a driver/user is authorized to drive. This could include the driver providing credentials to the orchestration service 104, such as driver's license number, or other similar credentials.

Once the vehicle has been identified and the user authenticated, the vehicle 102 can be unlocked and started (e.g., key on event) using the methods disclosed above. Once the vehicle 102 has been started, the orchestration service 104 can initiate a drive time tracking process. In some embodiments, drive time can be initiated at the key on event when the engine is started, or based on tracked movement of the vehicle 102. For example, when the engine of the vehicle 102 is started, the orchestration service 104 can initiate a clock or counter to track drive time. In some embodiments, the orchestration service 104 can track drive time parameters such as the aforementioned drive time, driving distance, as well as other more granular parameters such as changes in speed over time, which can indicate whether the vehicle is in traffic or is stopped. The end of the drive time can occur based on a key off event, such as when the vehicle is stopped and the engine is turned off. In various embodiments, the orchestration service 104 can utilize GPS data to determine when the vehicle has stopped, in combination with a signal from the vehicle controller 112 that indicates that an engine off event has occurred. These data indicate that a key off event has occurred, with verification that the vehicle is no longer in motion.

During drive time, the vehicle controller 112 and/or the orchestration service 104 can create a drive log that includes one or more of the drive time parameters collected during drive time. Stated otherwise, the vehicle controller 112 and/or the orchestration service 104 can automatically track driving parameters during a drive time of the vehicle by the user that is initiated by the start of the vehicle. It will be understood that the process or method steps disclosed can occur either at the vehicle level, the orchestration service level, or both. For example, the drive time parameter tracking can occur at the vehicle controller 112 level, with the logged drive time data being transmitted to the orchestration service 104 for collection and analysis.

The orchestration service 104 can maintain a driver log analysis process. To be sure, each jurisdiction in which the driver is operating the vehicle 102 may have a unique set of laws pertaining to commercial vehicle driving limits. That is, the driving of commercial vehicles may be governed by laws that control how long a driver can operate a vehicle before being mandated to stop and rest. Each jurisdiction may be subject to unique drive time limitations. For example, a first state may have drive time limitations mandating six hours of drive time, whereas a first state may have drive time limitations mandating eight hours of drive time. In some instances, another state may allow ten hours of drive time as long as there are one or more break periods during the ten hours. Due to these variances, the driver may be required to stop driving to comply with the drive time limitations. In some instances, a fleet operator or service may maintain a unique set of company specific drive time limitations that may be more stringent than those of a particular jurisdiction. For example, the fleet operator may set forth that the drive time limitations only allow a driver to drive for four hours before stopping for at least one hour.

The orchestration service 104 can be configured to compare current drive time parameters to drive time limitations to determine when the drive time of the user exceeds a predetermined time limit. The predetermined time limit can be based on a relevant statute where the driver and vehicle are currently positioned, or alternatively in the operating state of origin of the driver. The ability of the orchestration service 104 to track a location of the vehicle 102 in real-time or near-real-time allows for the orchestration service 104 the applicable law or drive time limitations that can be applied. Again, these methods can be performed at the vehicle controller level or the orchestration service level.

When it is determined that the drive time parameters, such as drive time, exceed the predetermined time limit, a warning message can be transmitted to the mobile device 108 or a human machine interface in the vehicle 102. warning message can indicate that the drive time has exceeded or will soon exceed the predetermined time limit. The vehicle controller 112 or orchestration service 104 can identify a potential stop where the vehicle 102 can be parked, based on a current location for the vehicle 102.

In addition to transmitting a message to the driver through their mobile device 108 or the HMI 120, the message can be transmitted to a supervisor service, such as a fleet service 138 that manages the driver and commercial vehicle.

Also, as the location of the vehicle 102 can be tracked in real-time, it is possible for the vehicle controller and/or the orchestration service to identify when or if the drive time limitations have changed based on a change in vehicle location. As noted above, one jurisdiction may have a first set of drive time limitations and another jurisdiction may have a second set of drive time limitations.

In addition to determining when a driver has exceeded a drive time limitation, the vehicle controller 112 or orchestration service 104 can automatically create a driving log in real-time or near-real-time. In one embodiment, the driving log begins to be populated when the engine is started (key on event). In another embodiment, the driving log begins to be populated when the vehicle begins moving.

The driving log can be populated with any drive time data that is collected by the vehicle controller 112 or orchestration service 104, such as current drive time, drive distance, speed, vehicle weight, and so forth. The drive time data can include time periods when the vehicle is in motion, as well as time frames where the vehicle is not in motion. These data can be specifically formatted into a driving log in some embodiments. That is, the raw data of the driving log can be specifically formatted in some embodiments. In one or more embodiments, the vehicle controller 112 or orchestration service 104 can select and apply a jurisdiction-specific (or generic) driving log template. The driving log template specifies driving data and layout, which can be based on a specific jurisdiction in which the vehicle is currently operating. For example, when the vehicle 102 enters a waypoint, such as a weigh station, the orchestration service 104 could select a driving log template from a plurality of driving log templates based on a current location of the vehicle.

The orchestration service 104 can populate the driving log template with relevant driving parameters collected since the last key-on event. The formatted driving log can be transmitted for display on the mobile device 108 or on the HMI 120. The driver could also transmit the formatted driving log to an authority, such as an inspector at the weigh station. The same process could be used to create a formatted driving log to present to a police officer or other authority when requested.

According to some embodiments, when it has been determined by the orchestration service 104 that the driver has exceeded an applicable driving predetermined time limit and the driver has turned off the vehicle, the vehicle controller 112 can prevent the engine of the vehicle from being turned back on until expiration of a rest period. For example, if the driver has driven for eight hours, the vehicle controller 112 can prevent the engine of the vehicle from being turned back until a specified time, such as six or eight hours after the key-off event. In some embodiments, this process can be controlled using the orchestration service 104, which transmits signals to the vehicle controller 112 to disable vehicle engine starting during the rest period. That is, the orchestration service 104 or vehicle controller 112 can cause the vehicle to be disabled after a key off event when the drive time has exceeded the predetermined time limit.

In some embodiments, an override code can be input by the driver through their mobile device 108 or the HMI 120 to allow the vehicle to be operated during the rest period. This would allow the vehicle to be moved if a situation warrants, such as an emergency event. In some embodiments, the driver can request that the vehicle be permitted to move by contacting the fleet service 138, which communicates with the orchestration service 104. The orchestration service 104 can transmit to and receive signals from the vehicle controller 112 through the OEM connectivity service 134 in order to allow for these rest period activation processes.

Figure 6:
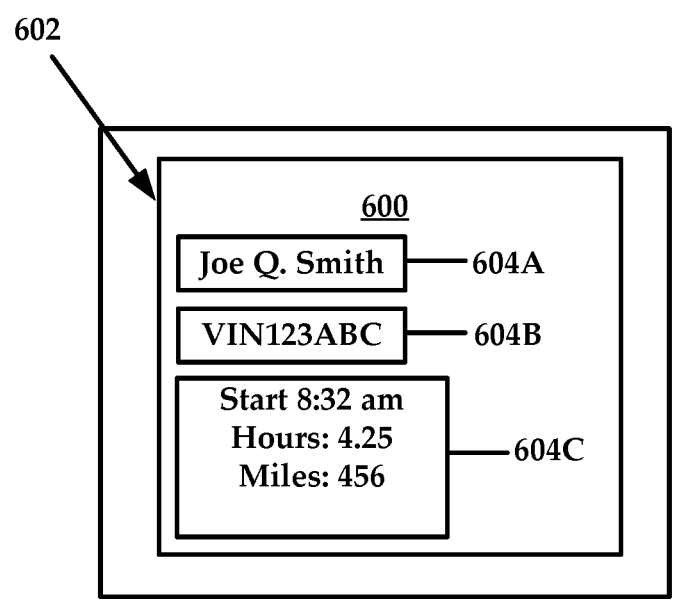
FIG. 6 illustrates a GUI that can be displayed on a human machine interface or mobile device, the GUI being used to practice aspects of the present disclosure.

FIG. 6 illustrates an example template that can be utilized in accordance with the present disclosure. The template 600 can include a layout 602 having a specific format with fields, such as fields 604A-C. Field 604A can include a name and/or identifier of a driver of the vehicle. Field 604B can include a vehicle identifier. Field 604C can include driving log data, formatted according to any desired jurisdictional preference. For example, the field 604C can include aggregate data regarding driving time, driving distance, or any other collected drive time data. These aggregate data are calculated from the raw driving time data. Clicking on any of the aggregate data values may result in the display of more detailed and granular data that was used to calculate the aggregate data. Thus, the user or an authority can drill further into the data if necessary. The data could include other parameters such as on-time, off-time, drive time starts and ends, key-on and key-off events, and so forth. In one example, the driver may have various key-on and key-off events during a driving period, with each being time stamped by the vehicle controller. That is, the vehicle controller can automatically detect key-on/off events and timestamp these events in the driver log. Again, as noted above, the layout and data included in the template 600 can be based on the jurisdiction. The jurisdiction can be determined from GPS or other similar location data that are gathered for the vehicle 102.

Figure 7:
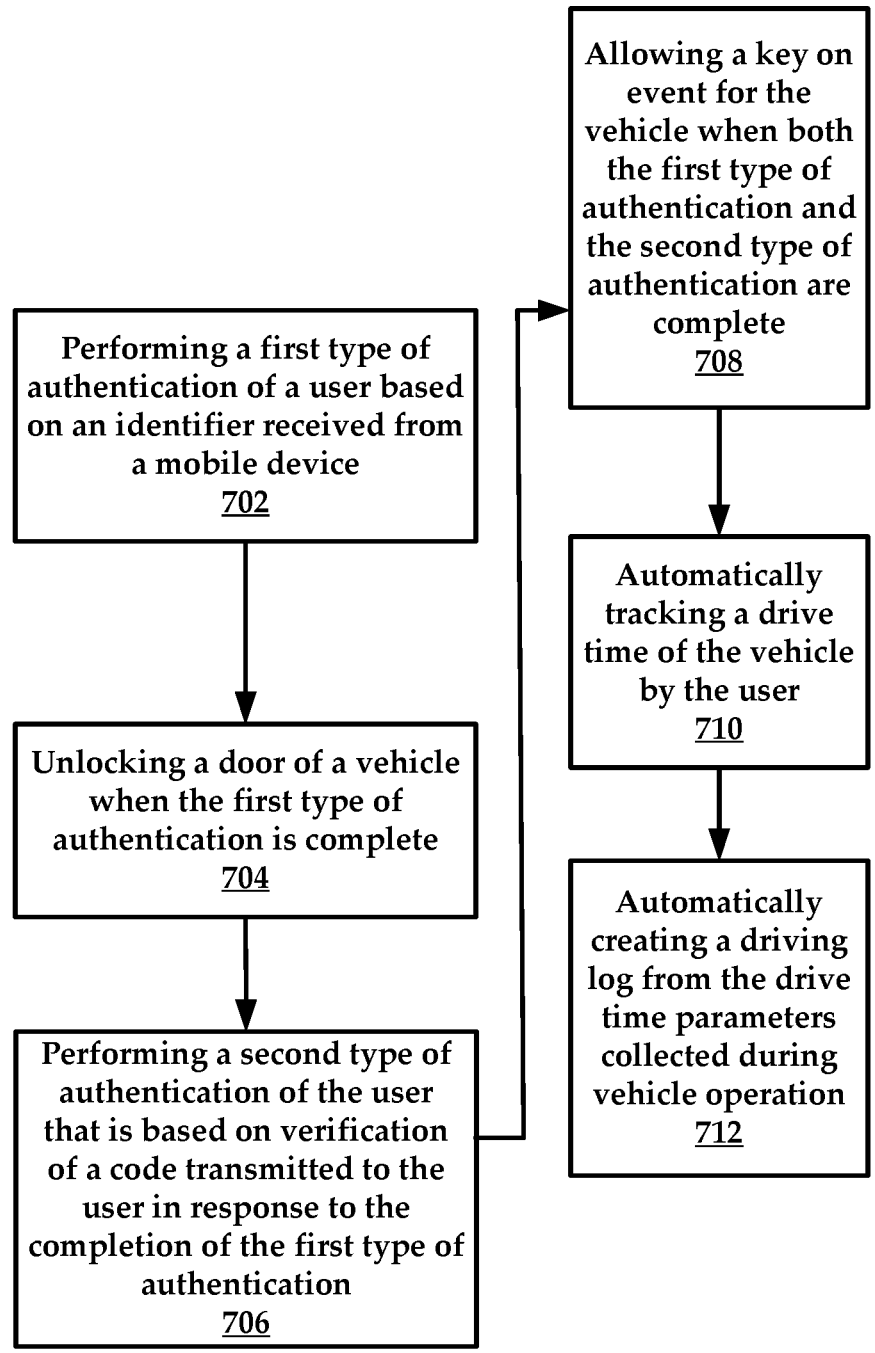
FIG. 7 is a flowchart of an example method of the present disclosure that includes automatic drive time logging.

FIG. 7 is a flowchart of an example method of the present disclosure. The method can include a step 702 of performing a first type of authentication of a user based on an identifier received from a mobile device. As noted above, this can include an orchestration service receiving a unique identifier from a mobile device. If the user is authenticated using the first type of authentication, the method can include a step 704 of unlocking a door of a vehicle when the first type of authentication is complete. The unlocking of the door can occur through an OEM connectivity service, as directed by the orchestration service.

The method can include a step 706 of performing a second type of authentication of the user that is based on verification of a code transmitted to the user in response to the completion of the first type of authentication. The transmitted code can be initiated when the first type of authentication is complete. In some embodiments, the code is transmitted to the mobile device when upon a user request. For example, the code is transmitted when the user calls into an authorizing entity, such as the fleet service. The fleet service can verbally convey the code to the driver. Thus, in some instances, a method may not require the transmission of a code to the mobile device directly for subsequent input into a GUI or other input mechanism of the vehicle.

The driver can then input the code into an HMI of the vehicle or into a GUI of their mobile device to complete the second type of authentication. Once the second type of authentication has been performed, the method includes a step 708 of allowing a key on event for the vehicle when both the first type of authentication and the second type of authentication are complete. This can include a vehicle controller allowing an ignition system of the vehicle to become operable. For example, the ignition system is inoperable until the first and second type of authentication occurs. Thus, if a key-on event is attempted before at least the second type of authentication occurs, the engine of the vehicle does not start.

Once the engine has been started (e.g., key-on event), the method includes a step 710 of automatically tracking a drive time of the vehicle by the user. Tracking the drive time can include automatically tracking drive time, which can extend from the key-on event to a subsequent key-off event, or could include any duration of time that involves key-on and/or key-off events in combination with vehicle movement and location information. In general, the tracking of drive time is directed to the notion of tracking how long the driver is operating the vehicle, which can be restricted when the driver is operating a commercial vehicle. In various embodiments, the method can include a step 712 of automatically creating a driving log from the drive time parameters collected during vehicle operation. According to some embodiments, step 712 specifically includes automatically generating a commercial driver logbook.

In some embodiments, the steps of authentication can be truncated such that only a first authentication type is required. Thus, once the door of the vehicle is unlocked through use of the OEM connectivity service, the user can start the engine of the vehicle, which triggers the automatic logging to occur.

Figure 8:
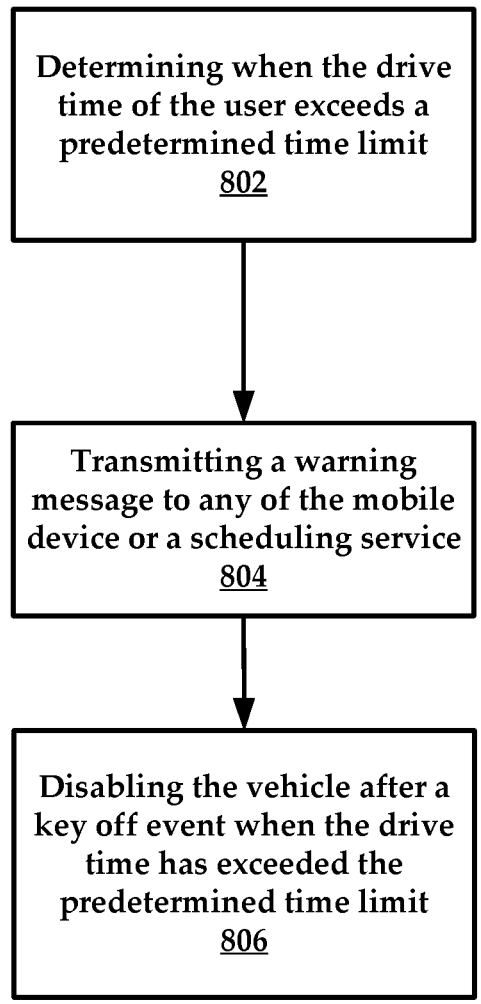
FIG. 8 is a flowchart of an example method of the present disclosure that includes vehicular control method related to drive time analysis.

FIG. 8 is another method of the present disclosure that can be incorporated after the method of FIG. 7. In various embodiments, the method includes a step 802 of determining when the drive time of the user exceeds a predetermined time limit. As noted above, a predetermined time limit can include a regulated period of time established by an authority, such as a state, local, or federal agency, or alternatively a fleet manager or other authority. The authority can establish guidelines that dictate how long a driver can operate a commercial vehicle before taking a mandated break or rest period. The particular predetermined time limit can be determined by pre-defined data that is loaded into the vehicle controller in some instances. The predetermined time limit could also be determined in real-time in from a location in which the commercial vehicle is operating. In some embodiments, the predetermined limit can be based on a vehicle type of the vehicle or a classification of the driver.

Next, the method includes a step 804 of transmitting a warning message to any of the mobile device or a scheduling service. The warning message indicates at least that the drive time that has been calculated has exceeded the predetermined limit. For example, if the driver has been driving a commercial vehicle for more than six hours (the predetermined time limit), a warning message can be transmitted to the driver's mobile device or the vehicle HMI that informs the driver that they are near or have exceeded their driving limit. In some embodiments, a warning message can be transmitted to an orchestration service or a fleet service.

In various embodiments, at the next key-off event, the method can include a step 806 of disabling the vehicle after a key off event when the drive time has exceeded the predetermined time limit. When the driver is nearing the predetermined time limit, the driver can be presented with a list of nearby locations where the vehicle can be parked.

Figure 9:
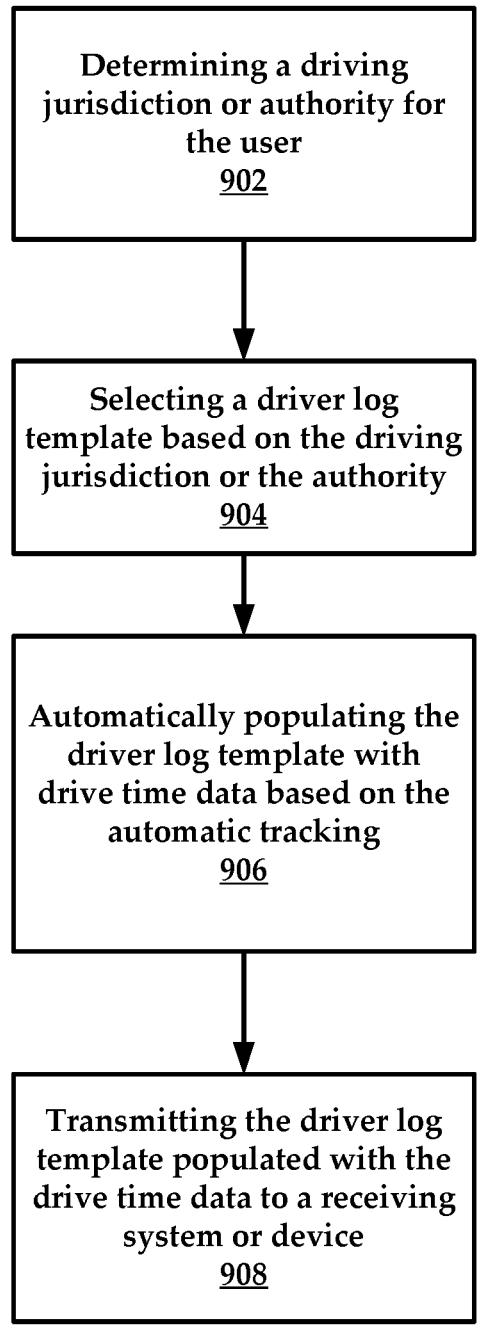
FIG. 9 is a flowchart of an example method of the present disclosure that includes driving log templating.

FIG. 9 is another flowchart of an example method of the present disclosure. In some embodiments, the method includes a step 902 of determining a driving jurisdiction or authority for the user. This can be accomplished through tracking a current location of the vehicle through GPS or other similar means. Next, the method includes a step 904 of selecting a driver log template based on the driving jurisdiction, as well as a step 906 of automatically populating the driver log template with drive time data based on the automatic tracking. In various embodiments, the method can include a step 908 of transmitting the driver log template populated with the drive time data to a receiving system or device. For example, the driver log template could be populated at the vehicle controller level or the orchestration service level. Once created, the driver log can be transmitted to a mobile device of the driver, a HMI of the vehicle, or to a third party, such as a person of authority (e.g., inspector, police, etc.).

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
   performing a first type of authentication of a user based on an identifier received from a mobile device;
   unlocking a door of a vehicle when the first type of authentication is complete;
   performing a second type of authentication of the user that is based on verification of a code transmitted to the user in response to completion of the first type of authentication;
   allowing a key on event for the vehicle when both the first type of authentication and the second type of authentication are complete; and
   automatically generating a commercial driver logbook based on real-time drive time data collected from the vehicle.

2. The method according to claim 1, further comprising:
   determining a driving jurisdiction for the user;
   selecting a driver log template for the commercial driver logbook based on the driving jurisdiction; and
   automatically populating the driver log template with the drive time data based on automatic tracking to create the commercial driver logbook.

3. The method according to claim 1, wherein the steps of unlocking the door of the vehicle and allowing the key on event for the vehicle, as well as automatic tracking of drive time, occurs through use of an original equipment manufacturer (OEM) connectivity service.

4. The method according to claim 1, further comprising transmitting a driver log template populated with the drive time data to a receiving system.

5. The method according to claim 4, wherein the drive time data comprises time periods when the vehicle is in motion, as well as time periods where the vehicle is not in motion.

6. The method according to claim 1, further comprising determining when a drive time of the user exceeds a predetermined time limit.

7. The method according to claim 6, further comprising transmitting a warning message to any of the mobile device or a scheduling service, the warning message being indicative of the drive time exceeding the predetermined time limit.

8. The method according to claim 6, further comprising disabling the vehicle after a key off event when the drive time has exceeded the predetermined time limit.

9. The method according to claim 8, further comprising selecting the predetermined time limit based on a vehicle type of the vehicle.

10. A system, comprising:
a processor; and
a memory, the processor being configured to execute instructions stored in the memory to:
perform at least two types of authentication to respectively unlock and start a vehicle based on at least an interaction between the vehicle and a mobile device of a user;
identify a driver based on the mobile device;
identify a vehicle type;
automatically track a drive time of the vehicle by the user;
generate a commercial driver logbook using drive time data of the vehicle;
determine a driving jurisdiction for the user;
select a driver log template for the commercial driver logbook based on the driving jurisdiction; and
automatically populate the driver log template with the drive time data based on the automatic tracking to create the commercial driver logbook.

11. The system according to claim 10, wherein the system controls the unlock and the start using an application programming interface that communicatively couples with an original equipment manufacturer (OEM) connectivity service.

12. The system according to claim 10, wherein the processor is further configured to cause transmission of the commercial driver logbook created using the driver log template populated with the drive time data to a receiving system.

13. The system according to claim 12, wherein the drive time data comprises time periods when the vehicle is in motion, as well as time periods where the vehicle is not in motion.

14. The system according to claim 10, wherein the processor is further configured to determine when the drive time of the user exceeds a predetermined time limit based on the drive time data.

15. The system according to claim 14, wherein the processor is further configured to cause a warning message to be transmitted to any of the mobile device or a scheduling service, the warning message being indicative of the drive time exceeding the predetermined time limit.

16. The system according to claim 14, wherein the processor is further configured to cause the vehicle to be disabled after a key off event when the drive time has exceeded the predetermined time limit.

17. The system according to claim 16, wherein the processor is further configured to cause a selection of the predetermined time limit based on a vehicle type of the vehicle.

18. A system, comprising:
an orchestration service that is configured to:
receive an identifier that is generated by any of an application residing on a mobile device or the orchestration service;
perform a first type of authentication of a user based on the identifier; and
identify a vehicle type of a vehicle, wherein the vehicle type indicates that the vehicle is a commercial vehicle; and
a vehicle controller that is configured to:
unlock the vehicle based on the first type of authentication;
start the vehicle based on a second type of authentication;
automatically track driving parameters during a drive time of the vehicle by the user that is initiated by the start of the vehicle; and
generate a commercial driver logbook using the drive time of the vehicle.

19. The system according to claim 18, wherein the orchestration service is configured to verify the identifier as the first type of authentication, wherein the identifier is verified if the user is registered with the orchestration service; and wherein the vehicle controller is configured to receive an unlock request from the orchestration service after the first type of authentication is complete.

* * * * *